United States Patent
Odendall

(10) Patent No.: US 7,926,333 B2
(45) Date of Patent: Apr. 19, 2011

(54) METHOD FOR DETERMINING THE OXYGEN STORAGE CAPACITY OF A CATALYTIC CONVERTER FOR A MOTOR VEHICLE AS WELL AS AN ASSOCIATED MEASURING DEVICE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 161 days.

(21) Appl. No.: 12/332,509

(22) Filed: Dec. 11, 2008

(65) Prior Publication Data

US 2009/0235726 A1    Sep. 24, 2009

(30) Foreign Application Priority Data

Dec. 12, 2007  (DE) .................. 10 2007 059 772

(51) Int. Cl.
*G01M 15/10* (2006.01)
(52) U.S. Cl. .............................. 73/114.75; 73/114.73
(58) Field of Classification Search ............... 73/114.73, 73/114.75
See application file for complete search history.

(56) References Cited

U.S. PATENT DOCUMENTS

| | | | | |
|---|---|---|---|---|
| 5,255,515 A | * | 10/1993 | Blumenstock et al. | 60/274 |
| 5,335,538 A | * | 8/1994 | Blischke et al. | 73/114.75 |
| 5,602,737 A | * | 2/1997 | Sindano et al. | 701/108 |
| 5,987,883 A | * | 11/1999 | Schneider | 60/274 |
| 6,119,447 A | * | 9/2000 | Eriksson et al. | 60/274 |
| 6,151,888 A | * | 11/2000 | Schneider et al. | 60/274 |
| 6,161,428 A | * | 12/2000 | Esteghlal et al. | 73/114.75 |
| 6,216,448 B1 | * | 4/2001 | Schnaibel et al. | 60/274 |
| 6,216,451 B1 | * | 4/2001 | Schnaibel et al. | 60/277 |
| 6,804,951 B2 | * | 10/2004 | Nader et al. | 60/277 |
| 6,915,628 B2 | * | 7/2005 | Kamoto et al. | 60/277 |
| 7,198,952 B2 | * | 4/2007 | Uchida et al. | 436/37 |
| 7,520,274 B2 | * | 4/2009 | Sawada et al. | 123/690 |
| 2009/0126344 A1 | * | 5/2009 | Arlt et al. | 60/276 |

FOREIGN PATENT DOCUMENTS

DE    41 28 823 A1    3/1993
DE    10 2005 024 872 A1    12/2006

* cited by examiner

*Primary Examiner* — Freddie Kirkland, III
(74) *Attorney, Agent, or Firm* — Novak Druce + Quigg LLP

(57) ABSTRACT

Method for determining the oxygen storage capacity of a catalytic converter for a motor vehicle using the signals of an oxygen probe upstream and an oxygen probe downstream from the catalytic converter which has the following steps of determining of a delay time which is dependent on the oxygen storage capacity between the signal of the oxygen probe upstream and the signal of the oxygen probe downstream from the catalytic converter, determining of the phase shift which is dependent on the oxygen probe dynamics between the signal of the oxygen probe upstream and the signal of the oxygen probe downstream from the catalytic converter, and correcting the determined delay time between the signal of the oxygen probe upstream and the signal of the oxygen probe downstream from the catalytic converter by a determined phase shift.

11 Claims, 4 Drawing Sheets

METHOD FOR DETERMINING THE OXYGEN STORAGE CAPACITY OF A CATALYTIC CONVERTER FOR A MOTOR VEHICLE AS WELL AS AN ASSOCIATED MEASURING DEVICE

The invention relates to a method for determining the oxygen storage capacity of a catalytic converter for a motor vehicle using the signals of an oxygen probe upstream and an oxygen probe downstream from the catalytic converter, as well as an associated measurement device.

BACKGROUND OF THE INVENTION

In order to determine the quality of the catalytic converter for installation in a motor vehicle and the quality of an installed catalytic converter, it is conventional to measure the oxygen storage capacity of the catalytic converter. In the process, measurements are taken such that the delay time between the oxygen probe signal of a probe upstream and an oxygen probe signal of an oxygen probe downstream from the catalytic converter is measured. This delay time corresponds to the oxygen storage capacity of the catalytic converter.

It is, however, problematical that the probe signal upstream and downstream from the catalytic converter changes not only as a function of the storage of oxygen, but, moreover, is influenced by the dynamic properties of the oxygen probe used downstream from the catalytic converter and by the different dynamics of the two probes used. The measured delay time therefore corresponds to the sum of the time delay which is actually to be measured based on the oxygen storage capacity of the catalytic converter and the probe delay time dictated by the probe dynamics.

This results in that for the case of a slow oxygen probe, overly large delay times are measured and thus an overly large oxygen storage capacity of the catalytic converter is deduced. The catalytic converter is therefore evaluated as too good compared to its actual efficiency.

In particular, for a comparatively slow oxygen probe and low oxygen storage capacity of the catalytic converter, the case may arise that solely based on the properties of the oxygen probe used a bad catalytic converter is assessed as good, that is, a misdiagnosis occurs.

For this reason there are currently plans, mainly in the USA, to legally prevent faulty assessments.

But the problem is that using the rising or falling edge of the signal of a jump probe, which is used as the oxygen probe, for a rich or lean transition it is possible only with great difficulty to factor in a probe-dictated delay time.

Thus the object of the invention is to devise a process which is improved in this respect.

SUMMARY OF THE INVENTION

To achieve this object, there is a method for determining the oxygen storage capacity of a catalytic converter for a motor vehicle using the signals of an oxygen probe upstream and an oxygen probe downstream from the catalytic converter, which has the following steps:
 determination of a delay time which is dependent on the oxygen storage capacity between the signal of the oxygen probe upstream and the signal of the oxygen probe downstream from the catalytic converter,
 determination of the phase shift which is dependent on the oxygen probe dynamics between the signal of the oxygen probe upstream and the signal of the oxygen probe downstream from the catalytic converter,
 correction of the determined delay time between the signal of the oxygen probe upstream and the signal of the oxygen probe downstream from the catalytic converter by the determined phase shift.

The method according to the invention is therefore based on the idea that the probe-dictated filtering of the signal, which is a voltage signal, results in a phase shift of the signal which depends on the probe dynamics and corresponds to the delay time of the oxygen probe which goes back to the probe dead time and the time delay dictated by probe filtration.

Therefore, according to the invention, as is conventional, first a delay time which is dependent on the oxygen storage capacity between the two probe signals, for example, a broadband probe and a jump probe, is measured. Then determination and measurement of the probe delay time takes place, that is, consideration and determination of the error caused by the probe dynamics (the dead time and filtration). The probe-induced delay time between the first measured signal curve and the second measured signal curve and the signal upstream from the catalytic converter and the signal downstream from the catalytic converter, that is, the difference of dynamic properties of the two probes, is decisive for determining the probe delay time.

The phase shift which is dependent on the dynamics of the oxygen probe (downstream from the catalytic converter and the probe downstream from the catalytic converter in comparison to the probe upstream from the catalytic converter) and which corresponds to a time difference is then subtracted from the determined delay time between the signal of the probe upstream and the signal of the probe downstream from the catalytic converter. The corresponding delay time which is determined overall is therefore corrected by the delay time of the probe. The corrected delay time which then remains is the measure of the oxygen storage capacity of the catalytic converter which is to be determined.

According to the invention, therefore the signal shift of the voltage measurement upstream from the catalytic converter and of the voltage measurement downstream from the catalytic converter is separated into the shift which goes back to the oxygen storage capacity of the catalytic converter and a second shift portion which is dictated by the probe dynamics. These two effects are then separated from one another in order to obtain a realistic value for the oxygen storage capacity of the catalytic converter using the measurement of the delay time between the signals upstream and downstream from the catalytic converter.

In this connection, determination of the phase shift is recommended for the middle range of the probe voltage or in the range in which the oxygen probes runs neither too flat nor too steep in order to prevent errors, for example, by deviations from a symmetrical characteristic which should arise when switching over between rich and lean operation of the motor vehicle and the motor vehicle engine. In particular, it should be noted that the phase shift is not determined in a plateau region in order to prevent unnecessary errors when determining the oxygen storage capacity and the probe delay time.

According to the invention, the phase shift between the probe signals upstream and downstream from the catalytic converter can be determined when the following steps are carried out:
 for a certain voltage value of the signal of an oxygen probe measured downstream from the catalytic converter in the region in which the signal of the oxygen probe is at least more or less proportional to the filling of the oxygen storage reservoir of the catalytic converter, determination of the two times assigned to this voltage value before and after switchover of the operation of the motor vehicle between rich and lean operation, determination of a first difference amount as the difference amount of the two times and cutting this first difference amount in half, determination of a second difference amount as the difference amount of the time assigned to the voltage value after switchover and the switchover time and computing the phase shift as the difference of the second difference amount and the first difference amount which has been cut in half.

The phase shift which corresponds to the probe delay time, that is, the time delay dictated by the dead time of the probe and filtration, is therefore determined such that for a suitable voltage value of the oxygen probe, that is, especially not in a plateau region, but in a region in which the signal of the oxygen probe is at least more or less proportional to the filling of the oxygen storage reservoir of the catalytic converter, the corresponding times are determined at which this same voltage value is measured once before switchover of motor vehicle operation, and once after switchover of motor vehicle operation. The switchover process thereby can be both a switchover process from rich into lean operation and also a switchover process from lean operation into rich operation.

These two times which are advantageously determined in seconds, counted from a certain starting time of the measurement, are then used to form a difference, therefore the smaller time value is subtracted from the larger time value in order to obtain a difference amount. This difference amount is then cut in half. The halving of the difference amount goes back to the expected symmetry of signal behavior around the instant of switchover. The time interval to the instant of switchover is decisive so that accordingly the determined time difference is to be divided by two.

Then a second difference amount is determined which is the difference amount of the time assigned to the (identical) voltage value after switchover and the switchover time itself. Therefore here the time interval between the switchover process (according to the probe signal upstream from the catalytic converter) and reaching the corresponding voltage value on a rising or falling edge of the signal is determined.

Without a phase shift of the probe signal upstream from the catalytic converter and of the probe signal downstream from the catalytic converter, this second difference amount should correspond to the first difference amount which has been cut in half. But the probe dynamics yields a delay which leads to this second difference amount having an amount which is greater than the halved first difference amount by the dead time and the filter-induced delay. In the process, the relative probe delay time with respect to the two probes used can be determined, but generally the delay time of the (slower) probe downstream from the catalytic converter is decisive.

The phase shift is accordingly determined as the difference of the second difference amount and the first difference amount which has been cut in half.

The phase shift can be determined especially when the following steps are carried out:

setting of the voltage value of the signal of the oxygen probe, which value is measured downstream from the catalytic converter, below a first threshold value;

supplying the catalytic converter with a certain mass of exhaust gas and an exhaust gas mixture with a certain enrichment such that the signal of the oxygen probe shows rising voltage values, determining the time at which the signal of the oxygen probe exceeds the second threshold value as a certain voltage value, when a third threshold value is exceeded by the signal of the oxygen probe, leaning of the exhaust gas mixture by an amount which corresponds to the preceding enrichment and determining the respective time, determining the time at which the signal of the oxygen probe falls below the second threshold value again, determining the first difference amount as the difference amount of the times at which the second threshold value is exceeded and not reached and at which this first difference amount is cut in half, determining the second difference amount as the difference amount of the time at which the second threshold value is not reached and the time at which the third threshold value is exceeded and computing the phase shift as the difference of the second difference amount and the halved first difference amount.

A corresponding result for the phase shift arises when the time at which the third threshold value is exceeded is subtracted from the arithmetic mean of the times at which the second threshold value is exceeded and not reached.

At the start of the method for determining the oxygen storage capacity, the catalytic converter is advantageously preconditioned such that the voltage of the binary oxygen probe connected downstream is below a threshold value which can be designated as $U_0$, for example, preferably 0.2 V.

Then the catalytic converter is supplied with a mass X of exhaust gas and a mixture of exhaust gas with enrichment of amount Y. As a result of the rich exhaust gas mixture the signal voltage of the probe which is connected downstream from the catalytic converter shows rising voltage values. The instant at which the signal voltage exceeds a voltage threshold $U_1$ which is to be established is stored as time $T_1$. The voltage threshold $U_1$ is advantageously in the region of 0.35-0.65 V, preferably in the region of 0.5-0.6 V.

After the signal of the probe connected downstream from the catalytic converter exceeds another threshold value which can be, for example, designated as threshold value $U_2$, the mixture upstream from the catalytic converter is leaned by the amount Y which corresponds to the preceding enrichment. Reasonable values for this other voltage threshold $U_2$ are in the range of 0.65-0.8 V, preferably of 0.7-0.75 V. The instant at which the leaning is triggered, that is, switchover from rich operation to lean operation takes place, can be designated as $T_2$, for example. The mass of exhaust gas should thus be kept as constant as possible. If it should not be possible to keep the mass of exhaust gas constant, the leaning should be adapted by the amount Y such that the amount of oxygen entry is kept constant.

The supply of a lean exhaust gas mixture to the catalytic converter leads to a reduction of the voltage for the probe connected downstream from the catalytic converter. The instant at which the probe voltage again falls below the threshold $U_1$ can then be designated as time $T_3$.

For the unknown delay time or phase shift of the probe when this delay time is designated as time $T_4$, the formula is as follows:

$$T_4 = \frac{T_3 + T_1}{2} - T_2.$$

Then the value which has been measured for the oxygen storage capacity (the total resulting delay time) can be corrected by this probe delay time in order in this way to obtain the actual value of the oxygen storage capacity as the corrected value.

According to the invention, the second threshold value can be raised so far that the times are identical when the threshold value is exceeded and not reached again. The voltage threshold $U_1$ is accordingly raised so far that for times $T_1$ and $T_3$ the relationship $T_1=T_3$ applies.

According to the invention, the phase shift can be determined for the switchover from rich into lean operation and/or for the switchover from lean into rich operation. By determining the phase shift for the two switchover options, differentiated correction can be done for the case in which the probe delay times deviate from one another depending on the type of switchover process. Thus a better assessment or determination of the oxygen storage capacity of the catalytic converter is possible. For the above described method which is referenced to the threshold value, the process changes for the reverse switchover process such that an upper threshold value becomes a lower one and vice versa.

The two times before and after switchover between rich and lean operation can be determined for the interposed signal of an oxygen probe which runs symmetrically around the switchover point which is assigned to the local extreme value, in particular when switching over from rich to lean operation for the signal of an oxygen probe which runs symmetrically around a local maximum and/or when switching over from lean to rich operation for the signal of an oxygen probe which runs symmetrically around a local minimum.

The determination of the phase shift is therefore based on symmetry considerations, the effect being used that both the rising and also the falling edge of the probe signal are affected by the deceleration of probe dynamics. Assuming that in the region of a certain probe voltage, for example, of 0.2 V or of 0.7 V as voltage values which are decisive for the determination of the correction value of the oxygen storage capacity according to the invention, the oxygen storage reservoir of the catalytic converter plays only a negligible part and, further assuming that the switchover instant of the exhaust gas composition of a catalytic converter is known, it can be assumed that the exhaust gas composition downstream from the catalytic converter and, accordingly, the pertinent probe voltage values should run mirror-symmetrically around the switchover point. The phase shift between the values which have actually been measured by the probe and the expected values then corresponds to the probe delay time. The local extreme value, that is, the maximum and minimum of the signal curves is correlated with the switchover point.

According to the invention, advantageously there is a switchover between rich and lean operation at the instant at which the catalytic converter is not in inertia. Thus the plateau regions in which as a result of a small rise there is a high error probability and deviations from symmetry occur in the state of inertia of the catalytic converter, are excluded from consideration for determining the correction value for purposes of correction of the oxygen storage capacity as precisely as possible.

In particular, preferably at the voltage value of the signal of the oxygen probe which is located within the final values which are assigned to the corresponding lambda value, there is a switchover between the rich and lean operation. This process ensures that the catalytic converter is not in inertia at the instant in question. Thus there is symmetry between the two times and signal characteristics before and after the switchover process.

Furthermore, the phase shift between the signal of the oxygen probe upstream and the signal of the oxygen probe downstream from the catalytic converter can be determined with additional consideration of the theoretical characteristic of the signal of the oxygen probe downstream from the catalytic converter. It is therefore possible, particularly with respect to checking the symmetry properties, in addition to examine the theoretical probe signal downstream from the catalytic converter and to carry out a corresponding model calculation. For this theoretical curve, the times belonging to the corresponding identical voltage value before and after switchover can be determined and the halved difference can be computed for this. This halved difference should correspond to the halved difference which is determined after filtering using the actual probe signal. If deviations should occur in this connection, the determination of the respective times for a better suited value of the probe voltage or correction of the amount of the time difference can be done respectively, for example, by averaging or weighted consideration of the values or the like.

Such a model examination or consideration of the theoretical probe signal is, however, not critically necessary, but fundamentally can be regarded as optional.

The phase shift, that is, the phase shift between the two signals of the oxygen probes, can be determined while taking into account a zonal division of the catalytic converter, particularly while talking into account a division of the catalytic converter into ten zones. For this purpose, a suitable measurement program which is based on a corresponding zonal division can optionally be used.

In this connection, it is considered that cyclic charging and discharging of the oxygen storage reservoir occurs for oxygen modulation upstream from the catalytic converter. When charging limits are exceeded or not reached in the oxygen storage reservoir, certain emission values downstream from the catalytic converter are exceeded.

The time delay between switchover with respect to the emissions upstream from the catalytic converter and exceeding the emissions downstream from the catalytic converter corresponds to the oxygen storage capacity of the catalytic converter. Exceeding the emissions cannot be recorded directly, but only using a lambda probe. The emission jump therefore appears only after the recharging of the oxygen storage reservoir and an additional time caused by the delay time of the probe.

The separation of these two effects according to the invention takes place optionally in the sense of differentiated evaluation of the catalytic converter while taking into account the axial division of the catalytic converter advantageously into ten zones, but optionally also into a different number of zones. For these ten or more zones the probe behavior with or without filtration can be examined and a differentiated correction of oxygen storage values can be carried out.

When using a suitable measurement program while taking into account catalytic converters which have aged differently, it is therefore possible to distinguish between the dynamics of the probe and the dynamics of the catalytic converter in a dedicated manner.

To determine the signals of the oxygen probes upstream and downstream from the catalytic converter, at least one broadband probe and/or at least one jump probe can be used. The jump probe shows a signal which jumps more or less only from an upper voltage value to a lower voltage value and vice versa, while with a broadband probe a differentiated signal characteristic between the two extreme values can be recorded. A jump probe generally constitutes a comparatively fast probe, while a broadband probe is a slower probe.

Generally there is a (single) probe upstream from the catalytic converter and there is another probe downstream from the catalytic converter. But it is likewise conceivable for the signal of an oxygen probe upstream and downstream from the catalytic converter, which signal is used according to the invention, to be in fact a combined signal of several oxygen probes or for there to be several oxygen probes upstream and downstream from the catalytic converter, using suitable combinations of signals of the probes upstream and downstream from the catalytic converter one correction for the oxygen storage capacity at a time being determined in order in this way to obtain an optimum correction overall with maximum possible error elimination.

Moreover, the invention relates to a measurement device for determining the oxygen storage capacity of a catalytic converter for a motor vehicle using the signals of an oxygen probe upstream and an oxygen probe downstream from the catalytic converter, which is made for determining a delay time dependent on the oxygen storage capacity between the signal of the oxygen probe upstream from the catalytic converter and the signal of the oxygen probe downstream from the catalytic converter, as well as for determining the phase shift which is dependent on the oxygen probe dynamics between the signal of the oxygen probe upstream and the signal of the oxygen probe downstream from the catalytic converter, and for correction of the determined delay time between the signal of the oxygen probe upstream and the signal of the oxygen probe downstream from the catalytic converter by the determined phase shift, in particular, according to the method as described above.

The measurement device therefore first determines a delay time between the respective signals of the oxygen probes upstream and downstream from the catalytic converter, which is dependent on the oxygen storage capacity, that is, also the probe delay time, whereupon a phase shift is furthermore determined between the two probe signals which is used for correction of the delay time which is determined overall, by this phase shift, that is, a time shift, being subtracted from the delay time which has been measured or determined beforehand.

The measurement device has suitable control and/or computation devices using which signal recording can be controlled by the probes or at least the data of the probes can be read out in order to evaluate these data using suitable computation rules which have been filed in the measurement device or the control device and/or the computation device.

Furthermore, the measurement device or its control and/or computation devices can have a screen or graphic user interface on a screen or the like in order to display the measurement and computation results or to enable user inputs for implementing certain measurement programs.

The measurement device can be used for purposes of checking with or in motor vehicles which are in operation or also in test use with test vehicles or on a test stand with vehicle components.

Other advantages, features and details of the invention will become apparent using the following embodiments and from the drawings.

DETAILED DESCRIPTION OF THE PREFERRED EMBODIMENTS OF THE INVENTION

Figure 1:
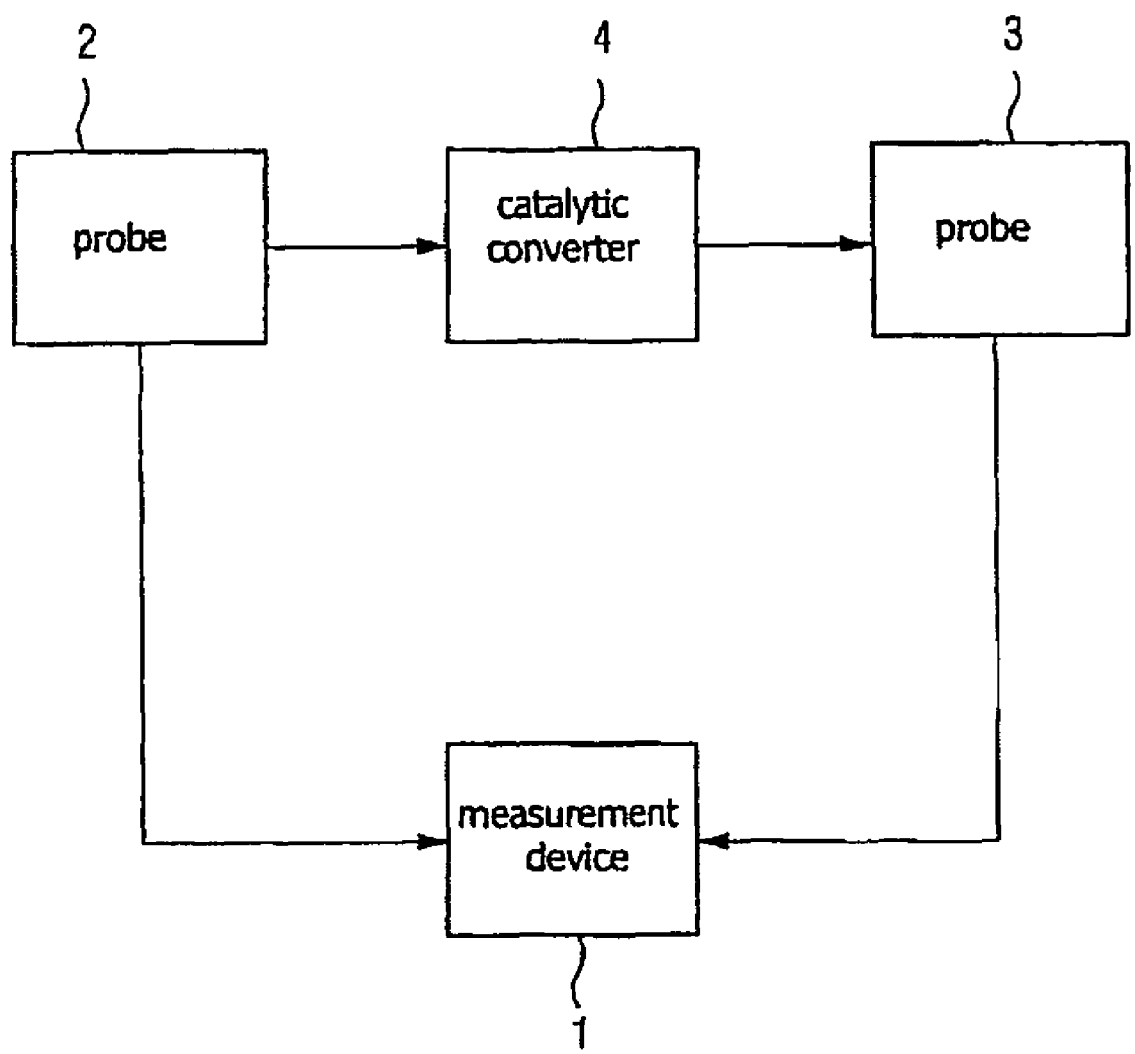
FIG. 1 illustrates the execution of the method according to the invention by means of a measurement device according to the invention.

FIG. 1 illustrates the execution of the method according to the invention by means of a measurement device 1 according to the invention. The measurement device 1 is supplied with the signals of an oxygen probe 2 and an oxygen probe 3 upstream and downstream from the catalytic converter 4, whereupon first the determination of a delay time which is dependent on the oxygen storage capacity between the signal of the oxygen probe 2 upstream from the catalytic converter 4 and the oxygen probe 3 downstream from the catalytic converter 4 is done with a corresponding computation device of the measurement device 1.

Furthermore, parallel or subsequently the phase shift is computed between the signal of the oxygen probe 2 upstream from the catalytic converter 4 and the signal of the oxygen probe 3 downstream from the catalytic converter 4 and is finally used to correct the delay time of the signals of the two oxygen probes 2, 3 which has been determined overall. The corresponding computations can be carried out by the measurement device 1 fully automatically or in corresponding other embodiments completely operator-guided or partially operator-guided, for example, with respect to operator-side selection of a suitable voltage value for determining the time difference which forms the basis for computing the phase shift.

The corresponding inputs can, however, also be present in their entirety in a programming means of the computation device of the measurement device 1 so that optionally after an operator-initiated start of the program for determining the oxygen storage capacity, the latter is otherwise determined fully automatic. Depending on the embodiment, the oxygen storage capacity can be determined while taking into account an axial zonal division of the catalytic converter 4, for the individual zones of the catalytic converter 4 different signal characteristics being present.

Figure 2:
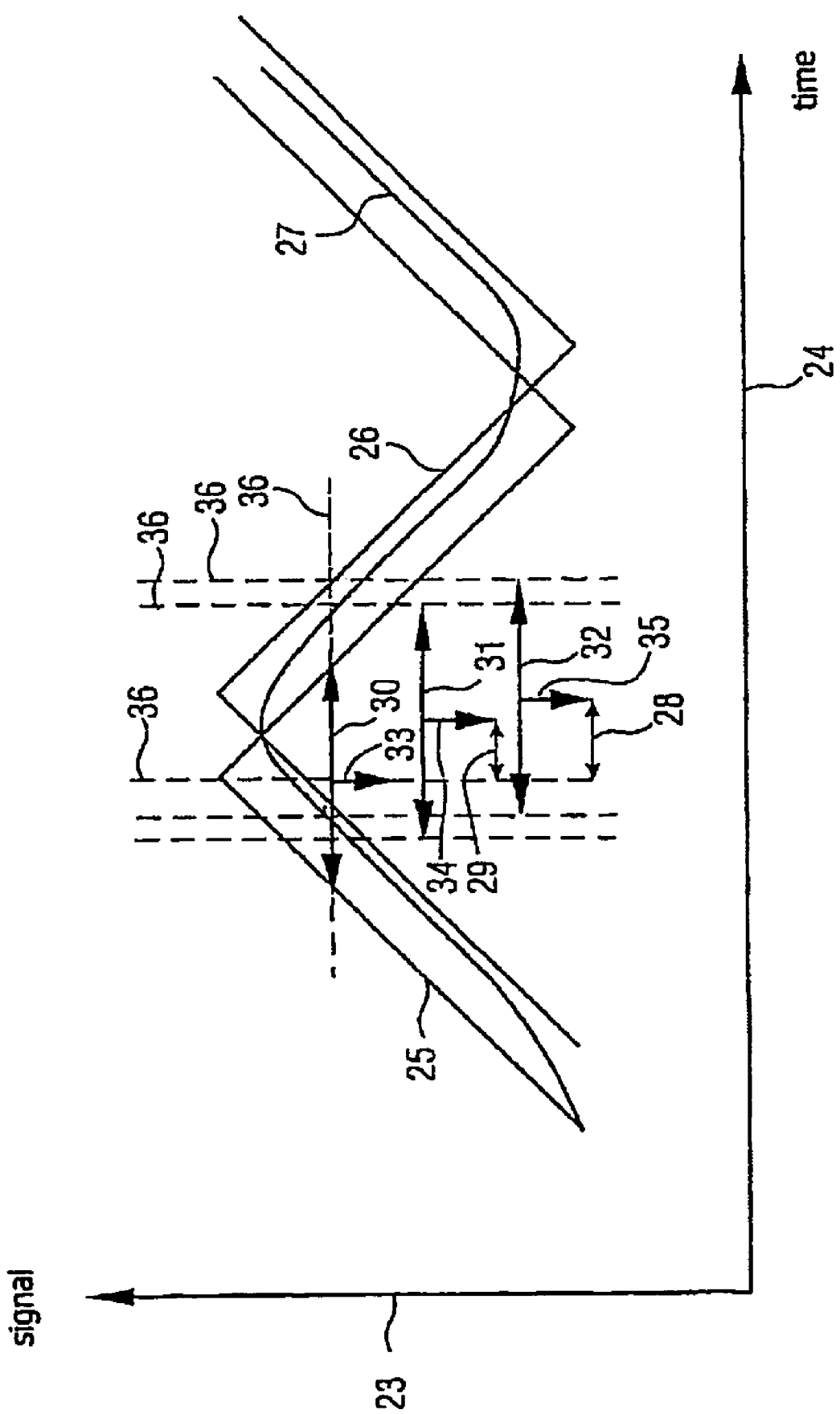
FIG. 2 illustrates the determination of a delay time for signal filtering and signal shift.

FIG. 2 shows an explanatory illustration for determining the delay time for signal filtration or a signal shift. In this instance, on the y axis 23 the signal is plotted, on the x axis 24, the time. The raw signal 25 in this example shows a triangular, zigzag characteristic. A pure signal shift yields the shifted signal 26, while when the signal is filtered, the shape is also influenced, as is indicated here by the filtered signal 27. Both signal filtration according to the filtered signal 27 and also the signal shift according to the shifted signal 26 can be assigned delay times which are indicated here for the case of a shift by the arrow 28, for the case of filtration by the double arrow 29. The determinations of the two delay times are based on the approach of examining symmetry, in which the values on the x axis 24 are examined with respect to the local maximum, in which the same signal values on the y axis 23 are exceeded on the one hand as the voltage threshold value, on the other hand are not reached as the voltage threshold value, for these threshold values then the difference of the pertinent x values being formed and cut in half. This determination of the first difference amounts is indicated here by the arrows 30, 31, and 32, the halving of the difference amounts being illustrated by the arrow 33, 34, and 35.

Determination of the distance of the values which can be assigned to each of the halved first differences on the x axis 24 to the mean value according to arrow 33 then yields the delay times 28 and 29 for the shift and the filtration. They therefore reproduce the difference amount which arises by the halved first difference amount being subtracted from the difference of the time assigned to reaching the signal value after switchover and the switchover time itself.

The broken lines 36 are auxiliary lines for the examination of the illustration for determining the times and signal values.

Figure 3:
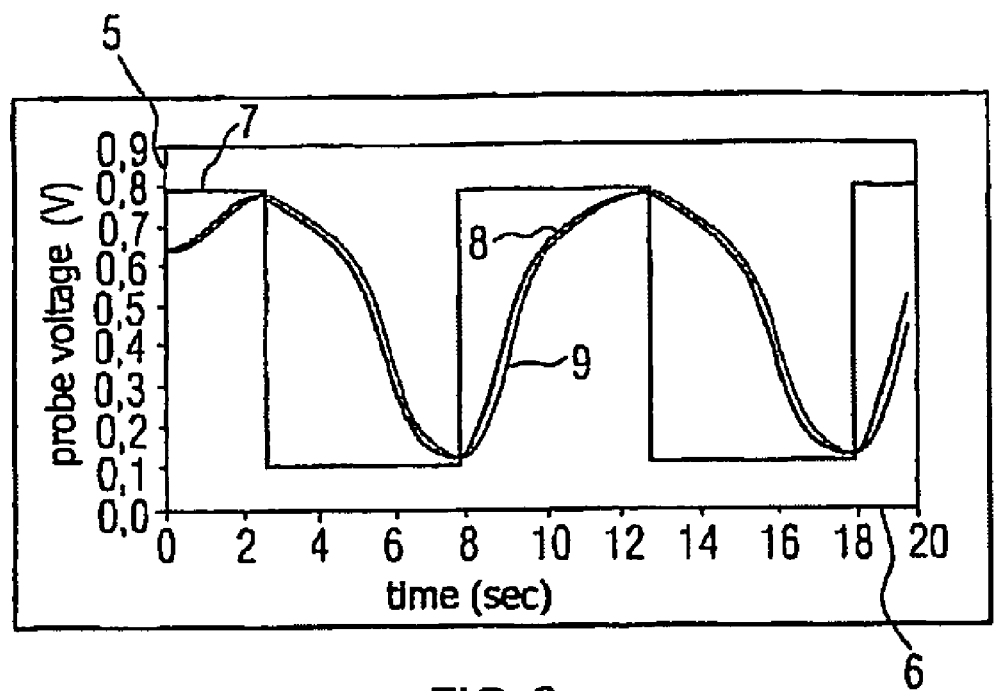
FIGS. 3 and 4 illustrate the shift of the signals from the oxygen probes downstream from the catalytic converter for the case of a fast and a slow probe.
Figure 4:
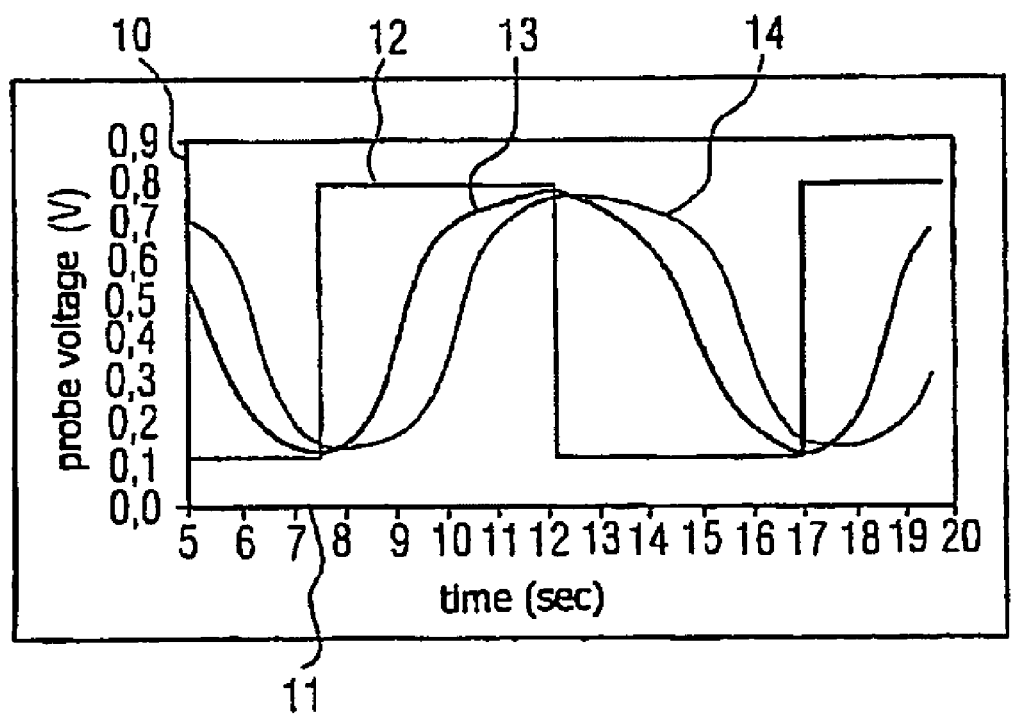

FIGS. 3 and 4 show illustrations for shifting of the signals of the oxygen probes for the case of a fast or a slow probe.

In this case, in FIG. 3 the y axis 5 plots the probe voltage in volts against the time in seconds on the x axis 6. The probe signal 7 upstream from the catalytic converter, the expected probe signal 8 downstream from the catalytic converter as a theoretical signal without being influenced by the probe dynamics, and the probe signal 9 downstream from the catalytic converter after filtering dictated by the probe, are shown. In FIG. 3 there is only a slight difference of the curve characteristics of the probe signal 8 downstream from the catalytic converter, as could be theoretically expected, and of the probe signal 9 downstream from the catalytic converter which is in fact actually measured and comprises the probe-induced filtration.

Accordingly, only a small phase shift is caused by the fast probe assumed here, so that consequently the error is comparatively small when the oxygen storage capacity is being determined by measurement of the delay time between the probe signal 7 upstream from the catalytic converter and the probe signal 9 downstream from the catalytic converter after filtration.

But the situation is different in the case shown in FIG. 4. Here in turn the y axis 10 plots the probe voltage in volts as a function of the time which is plotted on the x axis in seconds. The probe signal upstream from the catalytic converter is designated with reference number 12, the probe signal downstream from the catalytic converter, as should behave theoretically without the effect by filtration, is designated with reference number 13, and the probe signal downstream from the catalytic converter after probe-induced filtration is designated with reference number 14. In this case a considerable phase difference between the characteristics of the probe signals 13 and 14 can be recognized.

Thus here is the case of a slow probe connected downstream from the catalytic converter, for which failure to take into account the probe delay time would lead to a considerable error in the evaluation of the oxygen storage capacity of the catalytic converter. The determination of this phase shift according to the invention makes it possible to separate the signal shift which is dictated by the probe dynamics from the increase of the oxygen storage capacity of the catalytic converter, so that accordingly a false estimate of the catalytic converter quality can be prevented.

Therefore, errors are prevented which are dictated by, for example, the corresponding probe delay time of about one second between the probe signals 13 and 14 at a value of the probe voltage of 0.5 V.

Figure 5:
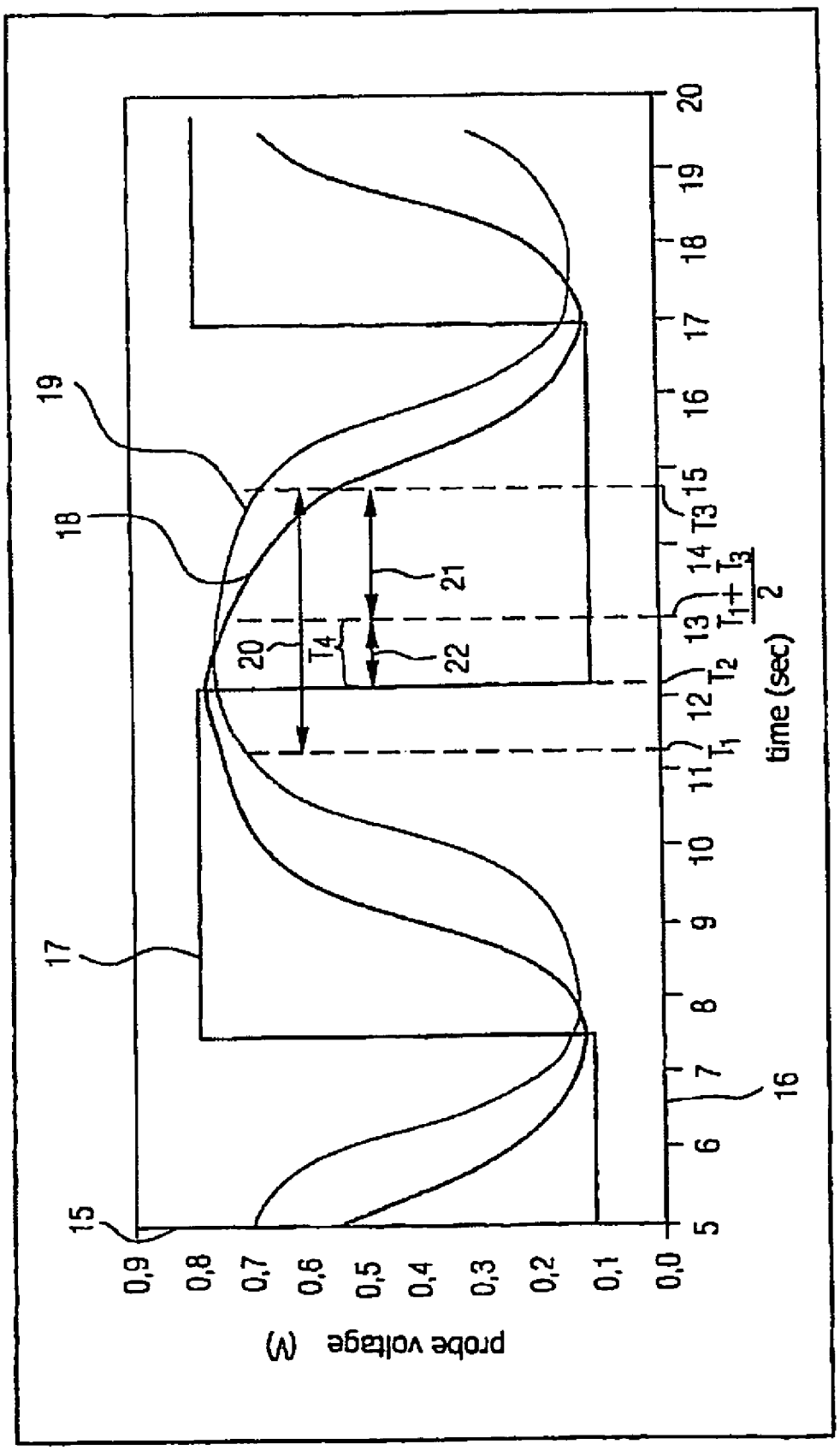
FIG. 5 illustrates the determination of a probe delay time according to the invention.

FIG. 5 illustrates the determination of the probe delay time according to the invention.

The y axis 15 of FIG. 5 in turn plots the probe voltage in volts, the x axis 16 plots the time in seconds. The probe signal 17 corresponds to the probe signal upstream from the catalytic converter, the probe signal 18 corresponds to the signal downstream from the catalytic converter in a model examination and the probe signal 19 corresponds to the actual signal downstream from the catalytic converter which contains the probe-induced filtration and is accordingly phase-shifted.

In the case illustrated here, for the probe signal 19 downstream from the catalytic converter and after filtration, the times are determined for which a probe voltage of 0.7 V as the threshold value is not reached or exceeded, the difference of these times being the time difference indicated by the arrow 20 (e.g., designated as $T_3-T_1$). This time is cut in half, the time indicated by the arrow 21 arising at $(T_3-T_1)/2$. This halved first difference amount is plotted from the instant with the probe voltage 0.7 V after switchover (threshold value not reached) in the direction to the preceding switchover instant. The switchover to leaning by an amount which corresponds to the preceding enrichment has taken place at time T2 when another threshold value of the probe signal 19, which was established beforehand, is exceeded. The difference between the time which is assigned to the probe voltage 0.7 V not being reached after switchover, and the switchover instant or a further threshold value being exceeded is taken into account as the second difference amount $(T_3-T_2)$ from which by subtracting the halved first difference amount according to the arrow 21 the probe delay time as the probe dead time or the time delay which is dictated by filtration (e.g., designated as $T_4$) according to arrow 22 arises at $(T_3+T_1)/2-T_2$.

In addition, it is possible to engage in the corresponding symmetry considerations for the theoretical probe signal 18 in order in this way, for example, to determine a second halved first difference amount which is used, for example, for checking the symmetry properties of the probe signal 10 downstream from the catalytic converter and after filtration. To improve the method according to the invention, optimization with respect to the values of the probe voltage which are used for the computation and a computation of the probe delay time for different voltages or different switchover processes from rich to lean operation and vice versa can be carried out. Further corrections can be achieved by improved simulations for determining the theoretical probe signal and a suitable probe selection or consideration of probe data.

The invention claimed is:

1. A method for determining the oxygen storage capacity of a catalytic converter for a motor vehicle using the signals of an oxygen probe upstream and an oxygen probe downstream from the catalytic converter, comprising:

determining a delay time which is dependent on the oxygen storage capacity between the signal of the oxygen probe upstream and the signal of the oxygen probe downstream from the catalytic converter, determining a phase shift which is dependent on the oxygen probe dynamics between the signal of the oxygen probe upstream and the signal of the oxygen probe downstream from the catalytic converter, and correcting the determined delay time between the signal of the oxygen probe upstream and the signal of the oxygen probe downstream from the catalytic converter by the determined phase shift, wherein the phase shift for a certain voltage value of the signal of the oxygen probe measured downstream from the catalytic converter in the region in which the signal of the oxygen probe downstream is at least more or less proportional to the filling of an oxygen storage reservoir of the catalytic converter, is determined by determining the two times assigned to this voltage value before and after switchover of the operation of the motor vehicle between rich and lean operation, determining a first difference amount as the difference amount of the two times and cutting this first difference amount in half, determining a second difference amount as the difference amount of the time assigned to the voltage value after switchover and the switchover time, and computing the phase shift as the difference of the second difference amount and the first difference amount which has been cut in half.

2. The method according to claim 1 wherein the phase shift is determined by:
setting of the voltage value of the signal of the oxygen probe, which value is measured downstream from the catalytic converter, below a first threshold value,
supplying the catalytic converter with a certain mass of exhaust gas and an exhaust gas mixture with a certain enrichment such that the signal of the oxygen probe shows rising voltage values,
determining the time at which the signal of the downstream oxygen probe exceeds the second threshold value as a certain voltage value,
leaning the exhaust gas mixture by an amount which corresponds to the preceding enrichment and determining the pertinent time when a third threshold value is exceeded by the signal of the downstream oxygen probe,
determining the time at which the signal of the downstream oxygen probe falls below the second threshold value again,
determining the first difference amount as the difference amount of the times at which the second threshold value is exceeded and not reached and at which this first difference amount is cut in half,
determining the second difference amount as the difference amount of the time at which the second threshold value is not reached and the time at which the third threshold value is exceeded, and
computing the phase shift as the difference of the second difference amount and the halved first difference amount.

3. The method according to claim 2, wherein the second threshold value is raised so far that the times are identical when the threshold value is exceeded and not reached again.

4. The method according to one of claim 1 wherein the phase shift for switchover from rich to lean operation and/or for switchover from lean to rich operation is determined.

5. The method according to one of claim 1 wherein the two times before and after switchover between rich and lean operation are determined for the interposed signal of the downstream oxygen probe which runs symmetrically around the switchover point which is assigned to the local extreme value, particularly when switching over from rich to lean operation for the signal of the downstream oxygen probe which runs symmetrically around a local maximum and/or when switching over from lean to rich operation for the signal of the downstream oxygen probe which runs symmetrically around a local minimum.

6. The method according to claim 1 wherein switchover between rich and lean operation takes place at an instant at which the catalytic converter is not in inertia.

7. The method according to claim 6 wherein at the voltage value of the signal of an oxygen probe which is located within the final value which is assigned to the corresponding lambda value there is a switchover between rich and lean operation.

8. The method according to claim 1 wherein the phase shift between the signal of the oxygen probe upstream and the signal of the oxygen probe downstream from the catalytic converter is determined while additionally taking into account theoretical characteristics of the signal of the oxygen probe downstream from the catalytic converter.

9. The method according to claim 1 wherein the phase shift is determined while taking into account a zonal division of the catalytic converter, particularly while taking into account a division of the catalytic converter into ten zones.

10. The method according to claim 1 wherein to determine the signals of the oxygen probes upstream and downstream from the catalytic converter at least one broadband probe and/or at least one jump probe are used.

11. A measurement device for determining the oxygen storage capacity of a catalytic converter for a motor vehicle using the signals of an oxygen probe upstream and an oxygen probe downstream from the catalytic converter, made for determining a delay time dependent on the oxygen storage capacity between the signal of the oxygen probe upstream and the signal of the oxygen probe downstream from the catalytic converter, for determining a phase shift dependent on the oxygen probe dynamics between the signal of the oxygen probe upstream and the signal of the oxygen probe downstream from the catalytic converter and for correction of the determined delay time between the signal of the oxygen probe upstream and the signal of the oxygen probe downstream from the catalytic converter by the determined phase shift, according to a method specified in one of the preceding claims.

* * * * *